United States Patent [19]

Bras et al.

[11] Patent Number: 5,332,361

[45] Date of Patent: Jul. 26, 1994

[54] SHAFT SEAL ARRANGEMENT FOR WATER PUMP

[75] Inventors: Johan C. M. Bras, Tricht; Edwin H. Tummers, Ede; Syme D. Van Ballegooy, Ijsselstein; Hubertus L. M. Peek, Hilversum; Vedran A. Tadic, Culemborg; Martin B. Verburgh, Amersfoort, all of Netherlands; Armin Olschewski, Schweinfurt, Fed. Rep. of Germany

[73] Assignee: SKF Industrial Trading & Development Company B.V., Nieuwegein, Netherlands

[21] Appl. No.: 989,789

[22] Filed: Dec. 8, 1992

[30] Foreign Application Priority Data

Dec. 11, 1991 [NL] Netherlands ............ 9102064
May 7, 1992 [NL] Netherlands ............ 9200816

[51] Int. Cl.⁵ ........................... F04D 29/10
[52] U.S. Cl. ...................... 415/231; 277/85; 277/215
[58] Field of Search ........... 415/230, 231; 277/61 R, 277/85, DIG. 6, 215

[56] References Cited

U.S. PATENT DOCUMENTS

| | | | |
|---|---|---|---|
| 2,373,463 | 4/1945 | Curtis | 415/231 |
| 2,951,721 | 9/1960 | Asp | 277/DIG. 6 |
| 3,578,803 | 5/1971 | Huhn | 277/85 |
| 3,658,349 | 4/1972 | Stevens et al. | 277/89 |
| 3,796,507 | 3/1974 | Smykal et al. | 415/231 |
| 3,894,741 | 7/1975 | McHugh | 277/27 |
| 3,926,443 | 12/1975 | Fenerty et al. | 277/85 |
| 4,277,072 | 7/1981 | Forch | 277/85 |
| 4,921,258 | 5/1990 | Fournier et al. | 277/215 |
| 5,158,431 | 10/1992 | Schellong et al. | 277/85 |

FOREIGN PATENT DOCUMENTS

| | | | |
|---|---|---|---|
| 0533594 | 12/1954 | Belgium | 415/231 |
| 0680004 | 2/1964 | Canada | 415/231 |
| 0050882 | 5/1982 | European Pat. Off. . | |
| 0379382 | 7/1990 | European Pat. Off. . | |
| 3701616 | 8/1988 | Fed. Rep. of Germany | 415/231 |
| 2612566 | 9/1988 | France . | |
| 0530443 | 12/1957 | Italy | 415/231 |
| 0178997 | 9/1985 | Japan | 415/231 |

OTHER PUBLICATIONS

Patent Abstracts of Japan, vol. 2, No. 80 (M-78), 1978, & JP,A,5349661 (Tsubakimoto Chain) Jun. 5, 1978, zie samenvatting.

H. K. Mullter: "Abdichtung bewegter Maschinenteile", 1990, Medienverlag Muller, Waiblingen, DE, zie bladzijde 130, figuur 44-GD (in de aanvraag genoemd).

Primary Examiner—Edward K. Look
Assistant Examiner—Mark Sgantzos
Attorney, Agent, or Firm—Rosen, Dainow & Jacobs

[57] ABSTRACT

A water pump, especially for the cooling system of a combustion engine of a car, has a housing with a space for a fluid. This space contains a pump device. The pump device is mounted on a shaft which projects form the housing. The shaft rotates while being supported by a bearing assembly. The bearing assembly has an outer stationary ring mounted on the housing. The fluid space id sealed with respect to the shaft by a sealing unit having a first ring connected to the shaft, and a stationary second ring mounted on the outer ring of the bearing assembly. The first and second rings have sealing surfaces which are directed toward one another, or extend axially. The first ring is resiliently biased toward the second ring, to provide a seal therebetween. The first ring is connected to the shaft via an elastic dampening and centering element located between the inner circumference of the first ring and the outer circumference of the shaft, and distributed over the circumference of the shaft.

11 Claims, 4 Drawing Sheets

SHAFT SEAL ARRANGEMENT FOR WATER PUMP

FIELD OF THE INVENTION

The present invention concerns a water pump, in particular for application in the cooling system of a combustion engine for a car.

BACKGROUND OF THE INVENTION

A water pump for the cooling system of a combustion engine of a car, of one type, si equipped with a housing with a space for fluid which contains a pump device placed on a shaft which projects outside of the housing. The rotates while being supported by a bearing assembly with a stationary outer ring mounted on the housing. The fluid space is sealed in relation to the shaft by means of a sealing unit equipped with a first ring connected to the shaft. A stationary second ring mounted on the outer ring of the bearing assembly. The rings are equipped with sealing surfaces which face one another or are about axial, and which are adjacent and sealed in relation to one another, whereby the first ring is loaded by a spring device in the direction of the second ring.

BACKGROUND OF THE INVENTION

In contemporary passenger cars, water pumps are critical for the performance and reliability of the engine, and careful attention should be paid to guarantee the reliable function of the pump. Nevertheless, research has shown that water pumps account for the greatest warranty and maintenance problems of car engines—33% of all water pumps produced are meant for the replacement market, while 80% of all water pumps must be replaced during the car's service life due to excessive leaking of the coolant.

Currently, the most common water pumps, for cars consist of five separate main components: an alumina housing, a shaft bearing assembly, a sealing unit, a pump impeller and a drive pulley. These main components are usually purchased by the water pump manufacturer from several different suppliers.

During the installation of the water pump, the first ring of the sealing unit is placed on the shaft, while the second ring is placed in a bore in the aluminum housing. The bearing assembly is placed in another bore in the housing. It has been shown that these two bores in the aluminum housing present deviations in eccentricity of up to 0.3 mm, while at the same time they often present deviation in their angles. The inherent vibrations of the combustion engine cause, furthermore, the radial displacement of the two sealing rings in relation to one another and, superimposed on the rotary motion of these sealing rings, this will lead directly—or over time—to an increase in the thickness of the film between the axial sealing surfaces of the rings. Because leaking along the sealing surfaces is a third power function of the film thickness, it will be clear that this represents a source of major leakage problems.

To reduce these problems, the article: "Abdichtung bewegret Machinenteile"; Müller, Heinz K.: Medienverl., Waiblingen 1990, proposes to attach the stationary second ring to the stationary outer ring of the bearing assembly.

As a result of this measure, the seal becomes independent of the tolerance of the water pump housing. Indeed, the sealing unit will be integrated in the shaft bearing assembly. This shaft bearing assembly is characterized by very small tolerances because of the finishing by means of grinding or a similar precision process. This contrasts with the water pump housing, whose tolerances are determined by cast and turning processes which are much less accurate. A further advantage of the integration of the shaft bearing assembly and sealing unit is that it can be made by one manufacturer, who will have more control over the proper tolerances.

SUMMARY OF THE INVENTION

The objective of this invention is to further improve the water pump of the type described above.

For that purpose, the water pump according to the invention is characterized by the fact that the first ring is placed on the shaft by means of an elastic dampening and centering element located between the inner circumference of the ring and the outer circumference of the shaft, and distributed over the circumference of the shaft.

It came as a surprise during the research that the dampening and centering element had a very favorable effect on leakage and wear and tear, and on the service life of the sealing unit. At the same time, the ring serves to offset any differences in tolerance between the inner circumference of the ring and the outer circumference of the shaft. Consequently, any leaking will be reduced to the minimal evaporation leakage resulting from the evaporation of the fluid meniscus between the two sealing surfaces of both rings. Although the dampening and centering element itself does not perform a sealing function, it contributes indirectly to the sealing because the first ring, which rotates in conjunction with the shaft, will be centered accurately by the element, and any vibrations from the engine and other shocks will be absorbed by the element.

With regard to the extension of the service life of the sealing unit, the following should be noted. One of the defects in the sealing unit of water pumps for cars originates as a result of the build-up of a crystalline layer on the sealing surfaces of the rings. Minor damage of this brittle layer is the main cause for the development of leaking over time along the water pump seal. According to the invention, this potential defect will be considerably reduced or even eliminated, because the considerable reduction or elimination of the normal leakage flow along the sealing surfaces of the rings will lead to less deposit on the sealing surfaces of solid particles from the coolant, which particles are responsible for the build-up of the damage-sensitive crystalline layer. As a result of the absence of the crystalline layer, larger damage-induced leaks will no longer occur. The very small deposits which may still result from the invention, will be removed by the normal contact of the sealing surfaces.

An elastic ring is a very simple, but effective embodiment of the dampening and centering element. The ring may be the same over its entire circumference, or it maybe interrupted in part or in total.

When there is direct support of, e.g., a carbon sealing ring by means of a relatively rough bore, there will be a preference for the embodiment with interrupted contact surfaces between the first ring and the dampening and centering element, to prevent the necessary axial forces generated by the spring element and the coolant system pressure on the sealing surface from being absorbed by the friction force between the dampening and centering element and the sealing ring.

The elastic ring may fit in a circumferential groove made in the outer circumference of the shaft or in the inner circumference of the first ring.

In case of wear and tear of one of the rings, the first ring placed on the shaft may move in relation to the shaft, in order to retain its sealing properties. If the groove has been made in the first ring, the elastic ring or any other dampening and centering element will move in conjunction with the first ring, whereas if the groove is made in the shaft, the first ring can move in relation to the dampening and centering element. Of course, the displacements in question are very small.

It is furthermore advantageous to manufacture the dampening and centering element of a polymer material with a higher thermal expansion coefficient than that of the first ring.

As a result, the dampening and centering element will be fairly loose when the engine is turned off and cold, while it will seat itself nicely when the engine and the water pump are being warmed up.

A very advantageous embodiment of the water pump according to the invention is characterized by the fact that the stationary second ring is manufactured of a material, preferably a metal with a thermal expansion coefficient which is about equal to that of the outer ring of the bearing assembly, and is mounted directly in the outer ring with a press fit, while at least the axial sealing surface of the second ring is equipped with a coating.

Due to the fact that, according to the invention, the entire ring is no longer made of a ceramic material or of carbon, but only includes a sufficiently thick surface layer of such material on one or on each sealing surface, the second ring can be pressed directly into the outer ring of the bearing assembly, leading to a cheaper and even more accurate attachment of the second ring to the bearing assembly, without the risk of damage or undesired deformation on account of different thermal expansion coefficients.

As described above, according to the invention, leakage along the sealing surfaces of the rings of the sealing unit can be reduced to practically zero. The only leaks will result from the evaporation of water from the coolant which usually consists of a mixture of water and glycol, stemming from the meniscus which develops on the inner edge of the sealing surfaces. This evaporation leak, which may amount to barely a few cubic centimeters over the economic life of a car, can be transported easily by the bearing assembly to the ambient environment. This transport mechanism is based on the difference which develops under operational circumstances between the humidity and temperature level inside the bearing assembly and the ambient environment. In this case, the two more expensive bearing seals, manufactured of a polymer material with a metal support, can be eliminated and replaced by a very simple and advantageous metal disk which lets the evaporation leakage pass through while keeping the bearing grease in. If the circumstances are such that drops collect in the space between the bearing assembly and the sealing surfaces, a porous, water-absorbent material may be inserted at that site. Any loose drops will then be spread over a larger area and evaporate at higher temperatures. The porous water-absorbent material may consist of, e.g., silica gel or a derivative.

In these designs, the leakage channel can also be eliminated, both in the bearing unit and in the pump house, offering not only direct economic advantages in the construction, but also solving the so-called "cosmetic leakage" problem, whereby owners of more expensive cars demand replacement of a water pump when a leakage streak appears on the motor block during the period of warranty. The latter problem is now usually solved by adding extra plating or other protection over the leakage track on the motor block, something which can be avoided according to the invention.

Even the extremely limited evaporation leaking described above can be reduced further if, by means of a sealing device, a sealed space is formed on the sides of the axial sealing surfaces of the first and second rings which are turned away from the fluid space. Because of this sealing device, which is placed in series with the sealing surfaces of the rings, the fluid meniscus will be located in a 100% saturated space, so that there will be no further evaporation of water. In that case at least, the sealing unit will be virtually hermetic. The sealing device mentioned may be very simple in design, and be sealed either against the shaft or against the first or second ring.

The invention also includes a shaft bearing assembly with integrated sealing unit meant for the water pump described above.

BRIEF FIGURE DESCRIPTION

The invention will be described in detail below with reference to the drawing which shows embodiments of the water pump according to the invention.

DISCLOSURE OF THE PREFERRED EMBODIMENTS

Figure 1:
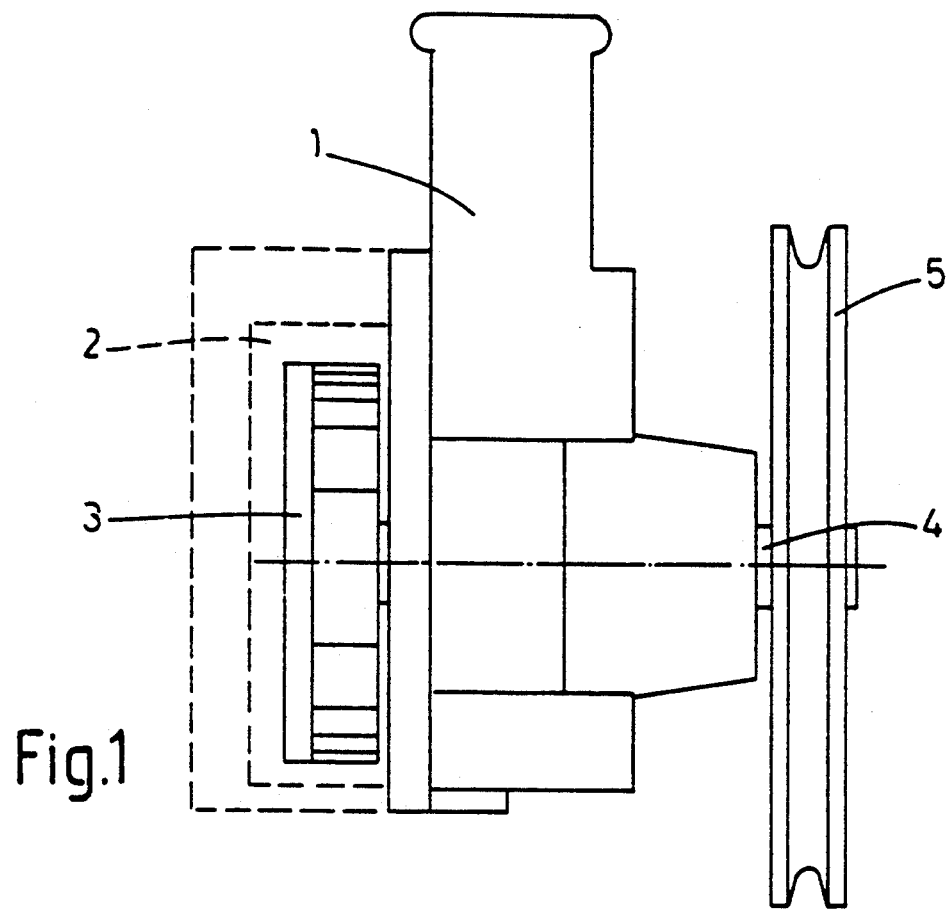
FIG. 1 is a frontal view of part of the water pump according to the invention.

FIG. 1 shows an embodiment of a water pump used for circulating coolant in the combustion engine of a car, in particular a passenger car. Obviously, the water pump may also be used for other applications.

The water pump contains as its main components a housing 1—shown in part—equipped with a fluid space 2 rendered schematically by a broken line, in which as second main component a pump device 3 is located in the form of an impeller, meant to circulate the coolant. The pump device 3 is placed on a shaft 4 whose end facing away from the pump device 3 is equipped with a pulley or belt disk 5, on which a belt moves to drive the water pump from the crankshaft of the combustion engine. The last two main components of the water pump are the bearing assembly to support the rotating shaft 4 and a sealing unit to seal the fluid space 2 in relation to the shaft 4.

Figure 2:
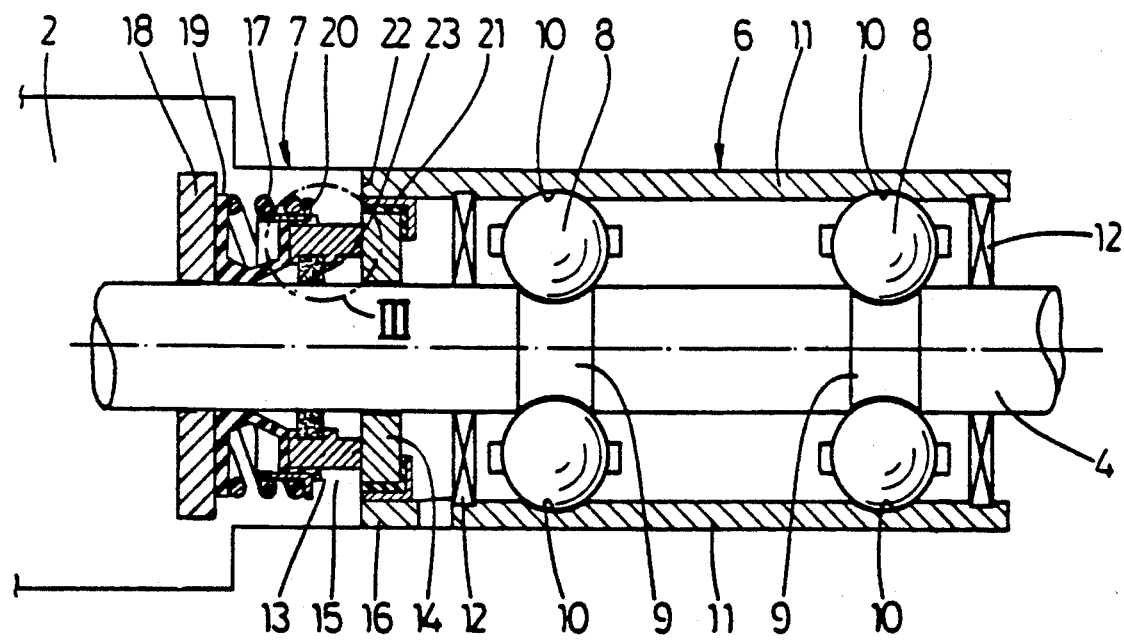
FIG. 2 is a partial cross-section on a larger scale of the water pump according to FIG. 1, with the shaft bearing assembly and the sealing unit according to the invention illustrated by means of a first embodiment.
Figure 3:
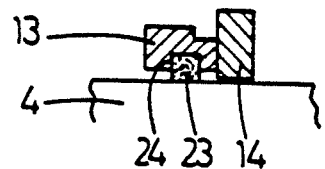
FIG. 3 shows detail III of the sealing unit in FIG. 2.

FIG. 2 shows a cross-section of the bearing assembly 6 and the sealing unit 7. The bearing assembly 6 consists in this case of two ball bearings 8 which run directly on rings 9 in the shaft 4, and directly on races 10 in a stationary outer ring 11 of the bearing assembly 6. Obviously, the bearing assembly 6 can also be executed with other bearings. The ball bearings 8 are located in a space partially filled with grease and closed off by grease seals 12.

At the end of the bearing assembly 6 facing the fluid space 2, sealing unit 7 is located which acts as a seal between the stationary parts connected to the housing 1 and the rotating shaft 4, in order to prevent leaking from the fluid space 2. The heart of the sealing unit 7 consists of a first ring 13 connected to the shaft 4, and a stationary second ring 14. The first and second rings 13, 14 are equipped with axial sealing surfaces 15, respectively 16, facing one another, which are adjacent to one another in such manner that they are form a fluid seal both when the shaft 4 stands still and when it operates.

To that effect, the first ring 13 is loaded by an axial spring 17 in the direction of the second ring 14. The axial spring 17—in this case a coil spring—rests with its end facing away from the first ring 13, against a positioning ring 18 which is solidly attached to the shaft 4. A rubber membrane 19 ensures the seal between the first ring 13 and the positioning ring 18, while a flange ring 20 transfers the force from the axial spring 17 via the membrane 19 to the first ring 13.

According to the invention, the second stationary ring 14 is connected directly to the bearing assembly 6, i.e., to its stationary outer ring 11. To that effect, the ring 14—in this case manufactured of a ceramic material—is pressed into the stationary outer ring 11 of the bearing assembly 6 with the interposition of a rubber-coated flange ring 21 of plate metal. The axial sealing surface 16 of the second ring 14 is accurately located in a single plane with the ground axial end surface 22 of the stationary outer ring 11 of the bearing assembly 6, so that the axial sealing surface 16 stands precisely at a right angle to the center line of the accurately positioned shaft 4. Thanks to the integration of the sealing unit 7 in the shaft bearing assembly 4, 6, the tolerances of the components can be properly controlled, resulting in a very accurate sealing unit 7, which allows very little leakage and which, thanks to the integration, also limits the minimum length of shaft 4.

Figure 6:
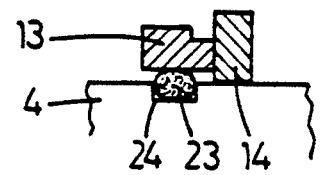
FIGS. 4–6 show alternative embodiments of the detail in FIG. 3.
Figure 4:
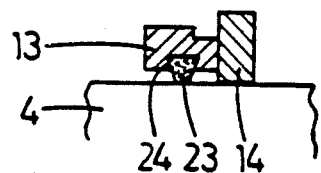

According to a further feature of the invention, the first ring 13 is supported at its inner circumference by a dampening and centering element which, in this embodiment, consists of a polymer ring 23, placed around the shaft 4. As FIGS. 3-6 show, various shapes of the polymer ring 23 are possible, e.g., the ring may in cross-section have the shape of a rectangle (FIG. 3), a reverse truncated cone (FIG. 4), a reverse cone (FIG. 5) or a circle (FIG. 6). Preferably, the polymer ring 23 will be mounted in a groove 24, which groove 24 may be made either in the outer circumference of the shaft 4 or in the inner circumference of the first ring 13. At the circumference of the ring 23 which is not placed in the groove 24, the ring is in contact with a smooth surface of the shaft 4 or the first ring 13. If the ring 23 is made of a material whose thermal expansion coefficient is greater than that of the first ring 13, the ring 23 will support the first ring 13 more rigidly at operating temperatures than at the ambient temperature; in fact, at the ambient temperature, the ring 23 will even become detached from the opposing surface. This means that when the water pump has cooled off, the first ring 13 can always be displaced by the axial spring 17 in the direction of the second ring 14 to compensate wear and tear of the axial sealing surfaces 16, 17. As mentioned, the polymer ring 23 acts as a dampening and centering element for the first ring 13, so that the first ring 13 will rotate very accurately in relation to the second ring 14, and any engine vibrations and shocks generated during driving will be very effectively absorbed, so that they will not have a negative effect on the sealing action of the sealing unit 7.

Figure 6A:
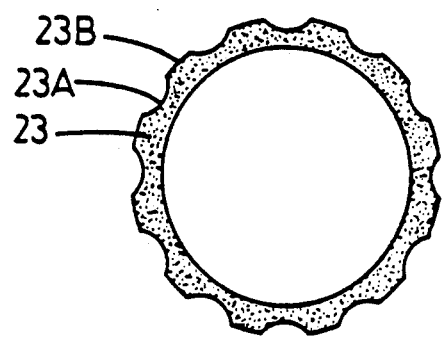
FIG. 6A shows a frontal view of the dampening and centering element in FIG. 6.
Figure 5:
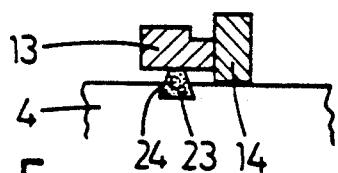

FIGS. 6A shows furthermore that the outer circumference of the elastic ring 23 is equipped with a number of recesses 23A distributed evenly over the circumference 23A, so that—in between—contact surfaces 23B are formed which, together, constitute an interrupted contact surface between the ring 23 and the first ring 13.

Figure 7:
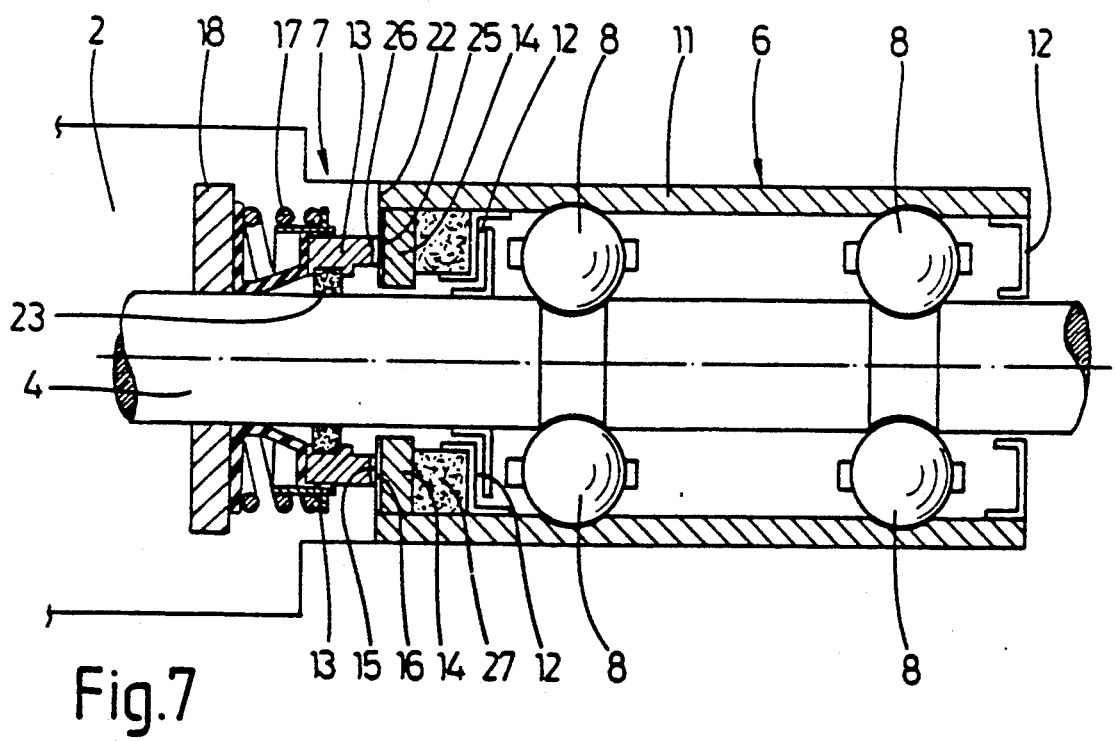
FIG. 7 is a cross-section of a second embodiment of the water pump according to the invention, corresponding to FIG. 2.

FIG. 7 shows a further developed embodiment of the water pump according to the invention. In this embodiment, the stationary second ring 14 is directly placed with a press fit in the stationary outer ring 11 of the bearing assembly 6. This is possible because the second ring 14 is manufactured of a material—preferably steel—with a thermal expansion coefficient equal to or slightly higher than that of the steel of the outer ring 11. In this manner, the second ring 14 can be integrated in the bearing assembly 6 in a very precise and economical manner. The sealing surface 16 of the second ring 14 is in this case equipped with a ceramic, hard-metal, monomolecular coating, or some other type of coating which reduces friction and wear and tear, and increases the service life of the seal. The costs for a similar second ring 14 of steel with special coating will be lower than those for a ring made entirely of the aforementioned materials. Similarly, the first ring 13 may be made of steel instead of carbon, with a special coating 14.

FIG. 7 shows further that the grease seals 12 are formed of labyrinth seals which allow penetration of vapors but not of fluids. As a result, the outer ring 11 of the bearing assembly 5 does not have to be equipped with a special drain, while the vapor leakage which develops at the meniscus on the inside of the sealing surfaces 15 and 16 of the first and second rings 13, 14, can be discharged into the ambient environment by way of the labyrinth seals 12 and the space of the bearings 8. If some water drops were to form under the influence of certain circumstances, for example because water vapors condense, they will be absorbed by a porous and water-absorbent material 27 inserted between the labyrinth seal 12 and the second ring 14. The absorbed water can be released later in the form of vapor.

Figure 8:
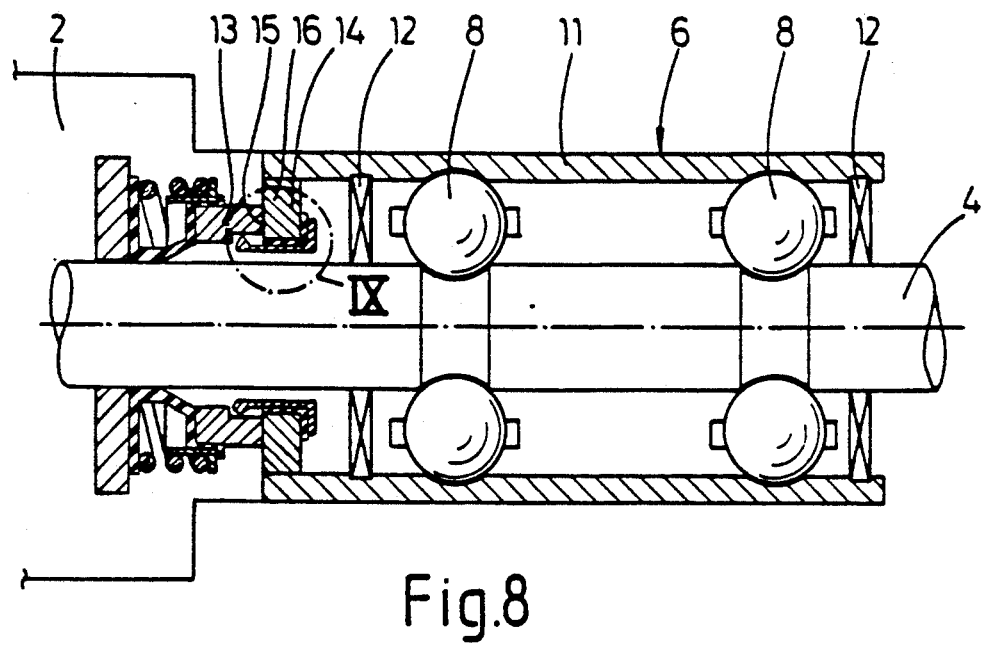
FIG. 8 is a cross-section of a third embodiment of the water pump according to the invention, corresponding to FIG. 2.
Figures 9, 10, 11:
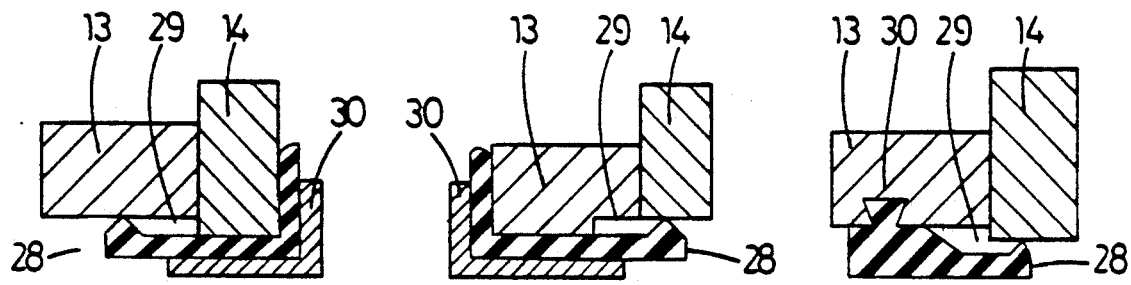
FIG. 9 shows detail IX in FIG. 8 on a larger scale.
FIGS. 10–13 are cross-sections of alternative embodiments corresponding to FIG. 9.

A further optimal embodiment with regard to vapor leakage through the sealing unit 7 is shown in FIG. 8, which eliminates the last leakage due to evaporation of the water in the coolant at the site of the meniscus on the inner circumference of the axial sealing surfaces 15, 16 of the first and second rings 13, 14. To that effect, the space in which the meniscus is located is sealed by an additional sealing device 28, so that the space 29 around the meniscus will become 100% saturated and thus prevent evaporation.

Figures 12, 13:
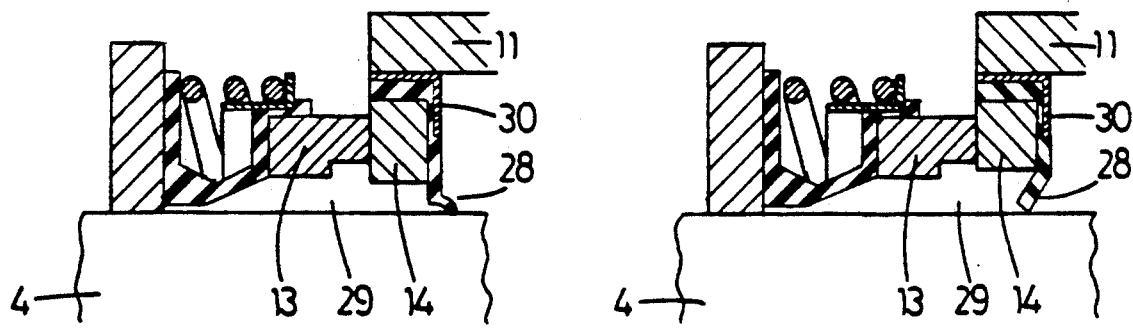

FIGS. 9-13 show various embodiments of the sealing organ 28 which—by means of an attachment device 30—can be attached to both the first ring 13 and the second ring 14, and can seal against the first ring 13 (FIG. 9) and the second ring 14 (FIGS. 10, 11), or against the shaft 4 (FIGS. 12, 13).

Figure 15:
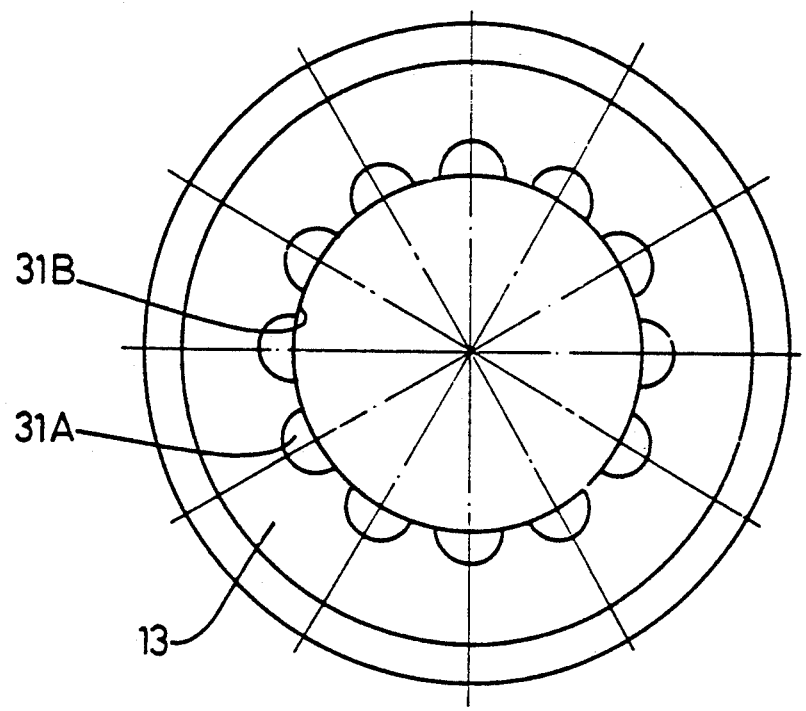
FIG. 15 shows a frontal view of the first ring of the invention according to FIG. 14.
Figure 14:
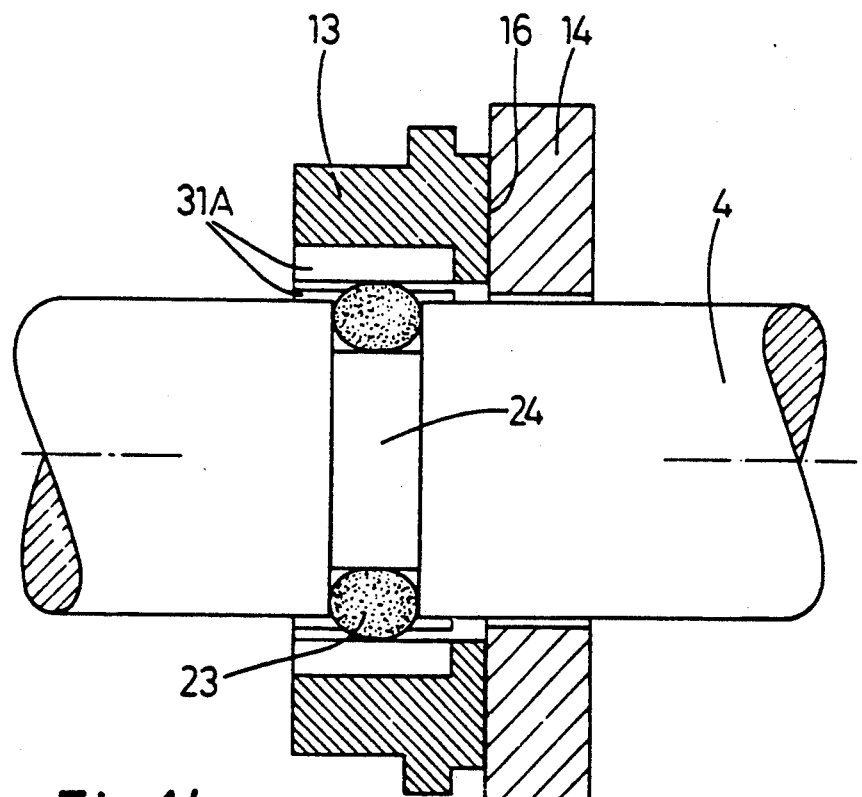
FIG. 14 is a similar cross-section to FIG. 3, and shows a further variation of the invention.

FIGS. 14 and 15 show a further variation of the first ring 13 and the dampening and centering element 23. In this case, too, there is an interrupted contact surface in the circumferential direction between the first ring 13 and the dampening and centering element 23 (as with the ring 23 in FIG. 6A), but in this case the outer circumference of the dampening and centering element 23 is smooth, while the inner circumference of the first ring 13 is equipped with a number of axial recesses 31A distributed evenly over the circumference, with contact surfaces 31B in between. The recesses 31A do not extend over the full length of the first ring 13, so that the sealing surface 16 is annular. This embodiment offers the advantage that the dampening and centering element 23 is very simple to execute, and that even an 0-ring used commonly for sealing purposes can be applied. The manufacturing costs for the first ring 23 will barely go up on account of the recesses 31A, if the ring 23 is manufactured through powder pressing, sintering or resin impregnation of graphite. Only the mold has to be adapted to form the recesses 31A. On the other hand, the ring 23 can also be manufactured through injection-molding of a mixture of carbon graphite and phenolic resin.

From all of the above it will be clear that the result of the invention is a water pump—as well as a shaft, bearing and sealing unit for application in the water pump—in which leakage problems are prevented in a very effective and simple manner. At the same time, the service life of the seal—and thus of the entire water pump—will be considerably improved. This means the elimination of a weak link in the reliability of current car engines. The invention also provides the possibility of shortening the shaft length of the water pump, so that manufacturers of combustion engines are left with greater clearance.

The invention is not limited to the description above, or the embodiments shown in the drawings which may be varied in several ways within the framework of the invention. For example, it is possible to use the combination of the shaft bearing assembly and sealing unit in applications other than a water pump.

We claim:

1. In a water pump having a housing with a space for fluid which contains a pump device on a shaft, the shaft projecting from the housing and being rotatably supported by a bearing assembly, the bearing assembly having a stationary outer ring on the housing, the fluid space being sealed with respect to the shaft by a sealing unit having a first ring, a second ring and means mounting the second ring to the outer ring of the bearing ring of the assembly, said first and second rings having sealing surfaces that face one another, and means for resiliently biasing the first ring in the direction of the second ring, and further comprising an inner ring having an outer circumferential surface which contacts the inner circumferential surface of said first ring and an inner circumferential surface engaging said shaft, for connecting said first ring to the shaft, the improvement wherein:
said inner ring comprises an elastic dampening and centering ring located between the inner circumference of the first ring and the outer circumference of the shaft; and further comprising
means for providing an interrupted contact at one of the circumferential surfaces of said inner ring to inhibit axial forces between said first and second rings from being absorbed by friction forces between the first ring and said inner ring.

2. Water pump according to claim 3 in which the means for providing an interrupted contact comprises recesses distributed about he elastic ring of the dampening and centering element.

3. Water pump according to claim 1 in which an elastic ring is placed with a precise fit in a circumferential groove made in the outer circumference of the shaft or in the inner circumference of the first ring.

4. Water pump according to one of the claim 1, in which the dampening and centering element is manufactured of a polymer material with a greater thermal expansion coefficient than that of the first ring.

5. The water pump of claim 1 wherein said recesses are distributed about the outer circumference of said elastic ring.

6. In a water pump having a housing with a space for fluid which contains a pump device on a shaft, the shaft projecting from the housing and being rotatably supported by a bearing assembly, the bearing assembly having a stationary outer ring on the housing, the fluid space being sealed with respect to the shaft by a sealing unit having a first ring, means for connecting said first ring to the shaft, a second ring and means mounting the second ring to the outer ring of the bearing ring of the assembly, said first and second rings having sealing surfaces hat face one another, and means for resiliently biasing the first ring in the direction of the second ring, the improvement wherein:
the means for connecting the first ring to the shaft comprises an elastic dampening and centering element located between the inner circumference of the first ring and the outer circumference of the shaft;
the stationary second ring is of a material with a thermal expansion coefficient which is substantially equal to that of the outer ring of the bearing assembly, and which is mounted with a press fit directly into the outer ring and said second ring further comprising a sealing coating on at least the axial sealing surface of the second ring.

7. Water pump according to claim 6, in which a porous water-absorbing material has been inserted between the sealing unit and the bearings of the bearing assembly.

8. Water pump according to one of the claims 1 or 6, in which a space, sealed by means of a sealing device, has been formed at the side of the axial sealing surfaces of the first and second rings facing away from the fluid space.

9. The water pump of claim 6 wherein the stationary second ring is of steel.

10. The water pump of claim 9 wherein said sealing coating is a ceramic material.

11. The water pump of claim 9 wherein said sealing coating is carbon.

* * * * *